United States Patent
Chen

(10) Patent No.: US 7,251,188 B2
(45) Date of Patent: Jul. 31, 2007

(54) MEMORY ACCESS INTERFACE FOR A MICRO-CONTROLLER SYSTEM WITH ADDRESS/DATA MULTIPLEXING BUS

(75) Inventor: Kuan-Chou Chen, Chia Li Town, Tai Nan County (TW)

(73) Assignee: Mediatek, Inc., Hsinchu (TW)

( * ) Notice: Subject to any disclaimer, the term of this patent is extended or adjusted under 35 U.S.C. 154(b) by 0 days.

(21) Appl. No.: 11/553,332

(22) Filed: Oct. 26, 2006

(65) Prior Publication Data

US 2007/0067580 A1    Mar. 22, 2007

Related U.S. Application Data

(63) Continuation of application No. 10/852,169, filed on May 25, 2004, now abandoned, which is a continuation of application No. 10/286,890, filed on Nov. 4, 2002, now Pat. No. 6,778,463.

(30) Foreign Application Priority Data

Nov. 6, 2001    (TW) ............................. 90127616 A

(51) Int. Cl.
*G11C 7/00* (2006.01)
(52) U.S. Cl. .............................. 365/230.06; 365/230.05
(58) Field of Classification Search ........... 365/230.06, 365/230.05
See application file for complete search history.

(56) References Cited

U.S. PATENT DOCUMENTS

| | | | |
|---|---|---|---|
| 5,517,624 A | 5/1996 | Landry et al. | |
| 5,793,693 A * | 8/1998 | Collins et al. | 365/230.01 |
| 5,805,610 A * | 9/1998 | Illes et al. | 714/738 |
| 5,931,930 A | 8/1999 | Krick et al. | |
| 6,192,451 B1 | 2/2001 | Arimilli et al. | |
| 6,438,016 B1 | 8/2002 | Keeth et al. | |
| 6,526,525 B1 | 2/2003 | Chang | |
| 2001/0034802 A1 | 10/2001 | Peng et al. | |
| 2005/0242834 A1* | 11/2005 | Vadi et al. | 326/37 |
| 2006/0050587 A1* | 3/2006 | Takatsuka et al. | 365/222 |
| 2006/0133158 A1* | 6/2006 | Shin | 365/189.05 |
| 2007/0025488 A1* | 2/2007 | Ho et al. | 375/372 |

* cited by examiner

*Primary Examiner*—Michael Tran
(74) *Attorney, Agent, or Firm*—Birch, Stewart, Kolasch & Birch, LLP

(57) ABSTRACT

A memory access interface for connecting a memory to a micro-controller having an address/data multiplexing bus and a microprocessor is proposed. The memory access interface includes an address latch, a multiplexer, and a data buffer. The address latch latches and outputs the lower-bit address signal on the address/data multiplexing bus of the micro-controller when an address-latch-enable signal is enabled. The multiplexer receives the lower-bit address signal latched by the address latch, a higher-bit address signal outputted from the micro-controller, and an address signal outputted from the microprocessor and selectively outputs the address signal of the micro-controller or the address signal of the microprocessor as the address signal of the memory according to a first control signal. The data buffer transmits the signal of the data bus of the memory to the address/data multiplexing bus of the micro-controller during a data cycle of the micro-controller, and maintains a high impedance state during an address cycle of the micro-controller.

11 Claims, 4 Drawing Sheets

MEMORY ACCESS INTERFACE FOR A MICRO-CONTROLLER SYSTEM WITH ADDRESS/DATA MULTIPLEXING BUS

The present application is a continuation of U.S. patent application Ser. No. 10/852,169 filed May 25, 2004 now abandoned which was a continuation of U.S. Ser. No. 10/286,890 filed on Nov. 4, 2002, now U.S. Pat. No. 6,778,463, which claims priority to Taiwan application 090127616 filed Nov. 6, 2001, the entire contents of each are hereby incorporated by reference.

BACKGROUND OF THE INVENTION

1. Field of the invention

The invention relates generally to a memory access interface, and more specifically to a memory access interface in which a memory is shared between a micro-controller having an address/data multiplexing bus and a microprocessor 2. Description of the Related Art In order to reduce the number of I/O pins in some micro-controllers, such as micro-controllers of the 80C32 series, a set of output pins are shared between a data bus and a lower-bit address bus. FIG. 1 shows a typical memory system having a micro-controller and the address/data multiplexing bus. Referring to FIG. 1, the micro-controller 11 utilizes an address latch 12 to latch the lower-bit address signal A7:0 of the address/data multiplexing bus A7:0/D7:0 when the address-latch-enable signal ALE is enabled The address signal A7:0 together with the higher-bit address signal A15:8 are inputted to the address bus of the memory 13. The reading signal/READ of the micro-controller 11 is transferred to the output-enabling control terminal OE of the memory 13 so as to enable or disable the output of the memory 13. When the reading signal/READ is enabled, the output from the memory 13 is also enabled, and the data corresponding to the address signal A15:0 is transferred to the data bus D7:0. The micro-controller 11 accesses the data of the data bus D7:0 of the memory through the address/data multiplexing bus A7:0/D7:0.

FIG. 2 shows a typical timing diagram during the accessing cycle of the micro-controller 11. As shown in FIG. 2, the accessing cycle of the micro-controller 11 is divided into an address phase and a data phase. The address-latch-enable signal ALE is enabled in the address phase, while the reading signal/READ is enabled in the data phase.

Because the memory in the memory system can only be accessed by a single micro-controller, the efficiency of the memory is poor. Therefore, the efficiency of the memory can be improved if two or more microprocessors are capable of sharing the memory.

SUMMARY OF THE INVENTION

In view of the above-mentioned problems, an object of the invention is to provide a memory access interface capable of sharing a memory between a micro-controller having an address/data multiplexing bus and one or more microprocessors.

To achieve the above-mentioned object, the memory access interface of the invention includes an address latch, a multiplexer, and a data buffer. The address latch receives a signal of the address/data multiplexing bus of the micro-controller and an address-latch-enable signal, and latches the signal of the address/data multiplexing bus and outputs the lower-bit address signal when the address-latch-enable signal is enabled. The multiplexer receives the lower-bit address signal outputted from the address latch, a higher-bit address signal outputted from the micro-controller, and an address signal outputted from a microprocessor The multiplexer is controlled by a first control signal of the micro-controller so as to provide the address signal of the micro-controller or the address signal of the microprocessor to the memory. The data buffer receives the signal of the data bus of the memory and is controlled by a second control signal of the micro-controller, for outputting the signal of the data bus to the address/data multiplexing bus of the micro-controller during a data phase of the micro-controller, and for keeping the output of the data buffer at a high impedance state during an address phase of the micro-controller.

DETAILED DESCRIPTION OF THE INVENTION

The memory access interface of the invention will be further described with reference to the accompanying drawings.

Figure 1:
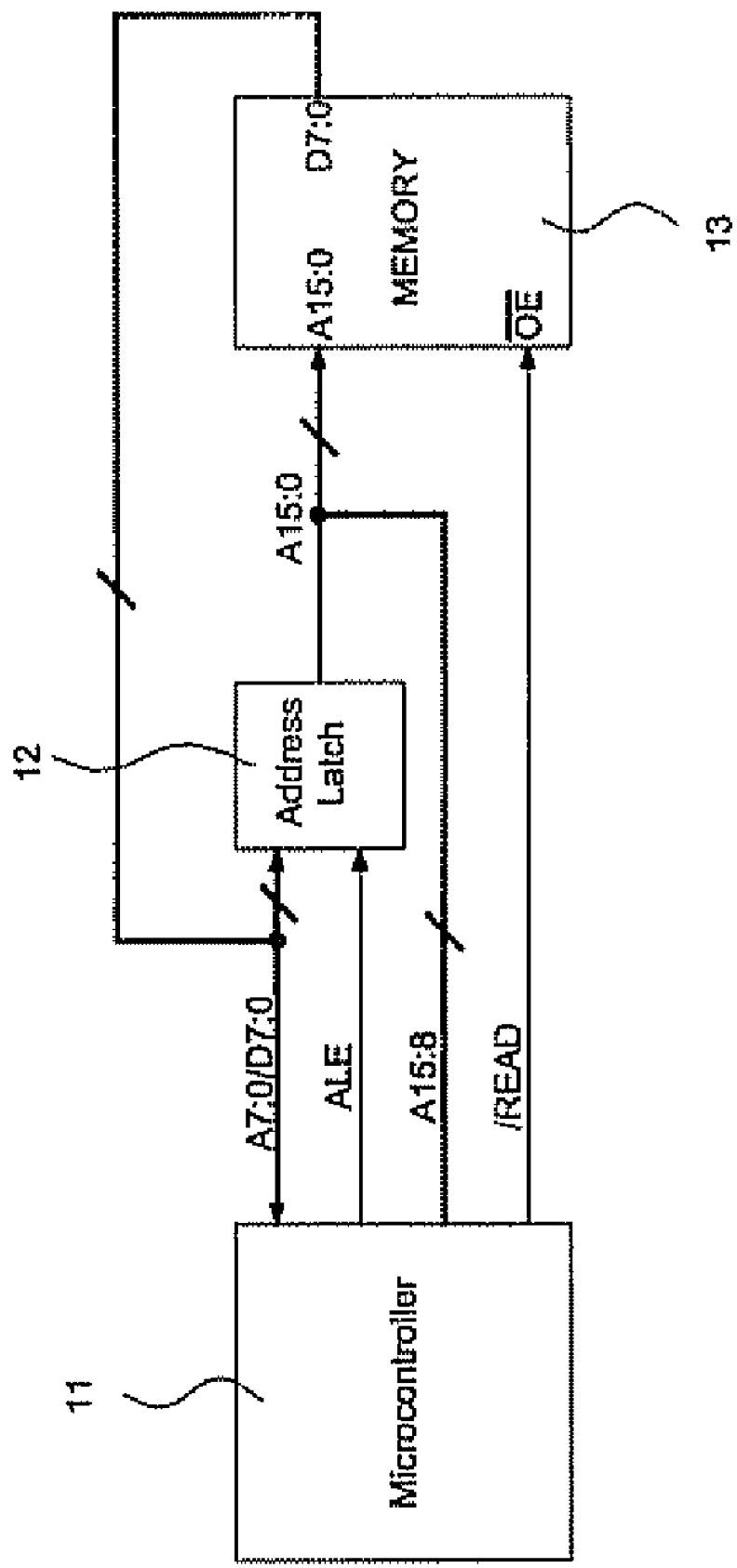
FIG. 1 shows a memory system having a micro-controller and the address/data multiplexing bus.
Figure 2:
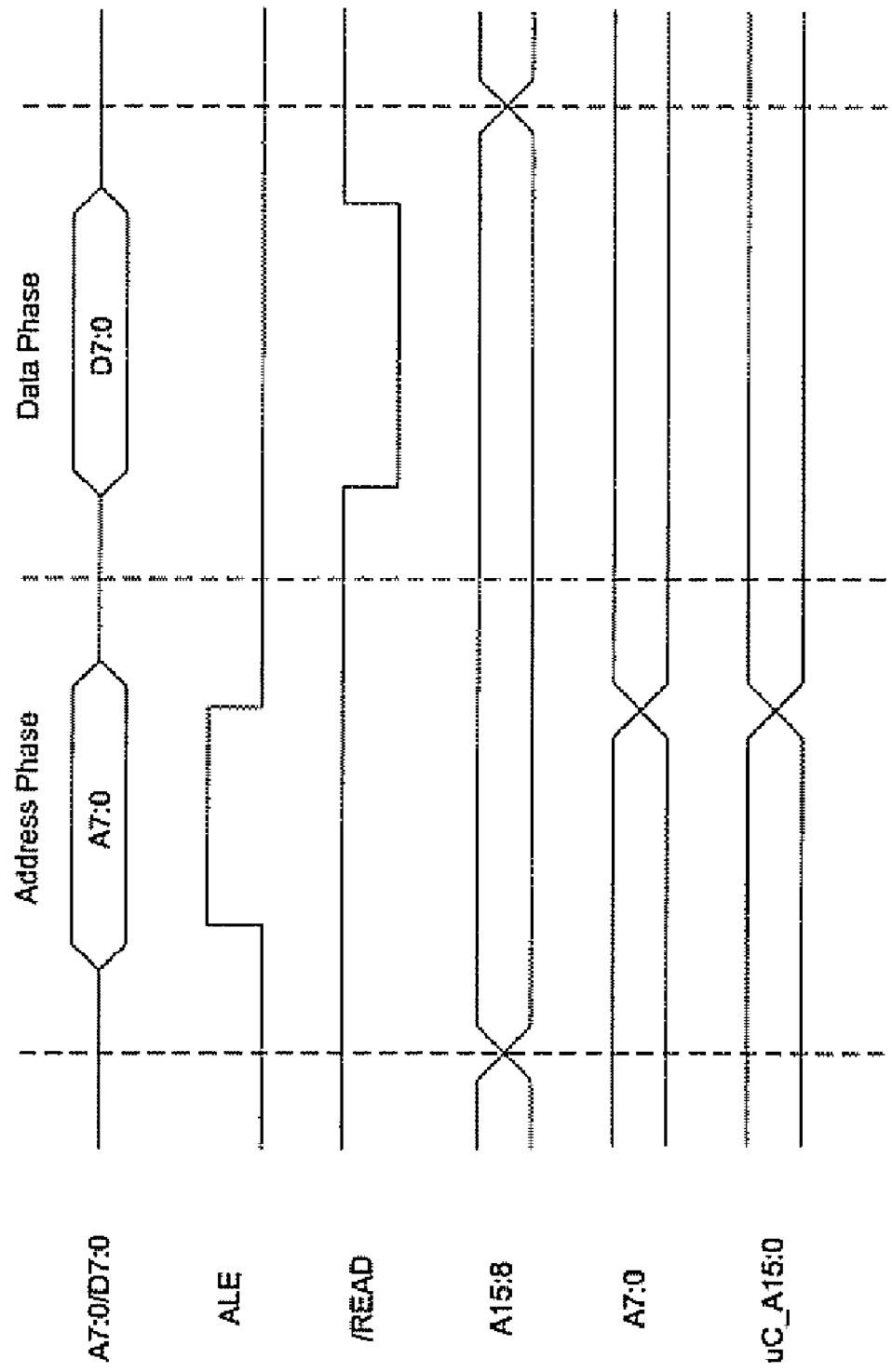
FIG. 2 shows a timing diagram during the accessing cycle of the micro-controller of FIG. 1.
Figure 3:
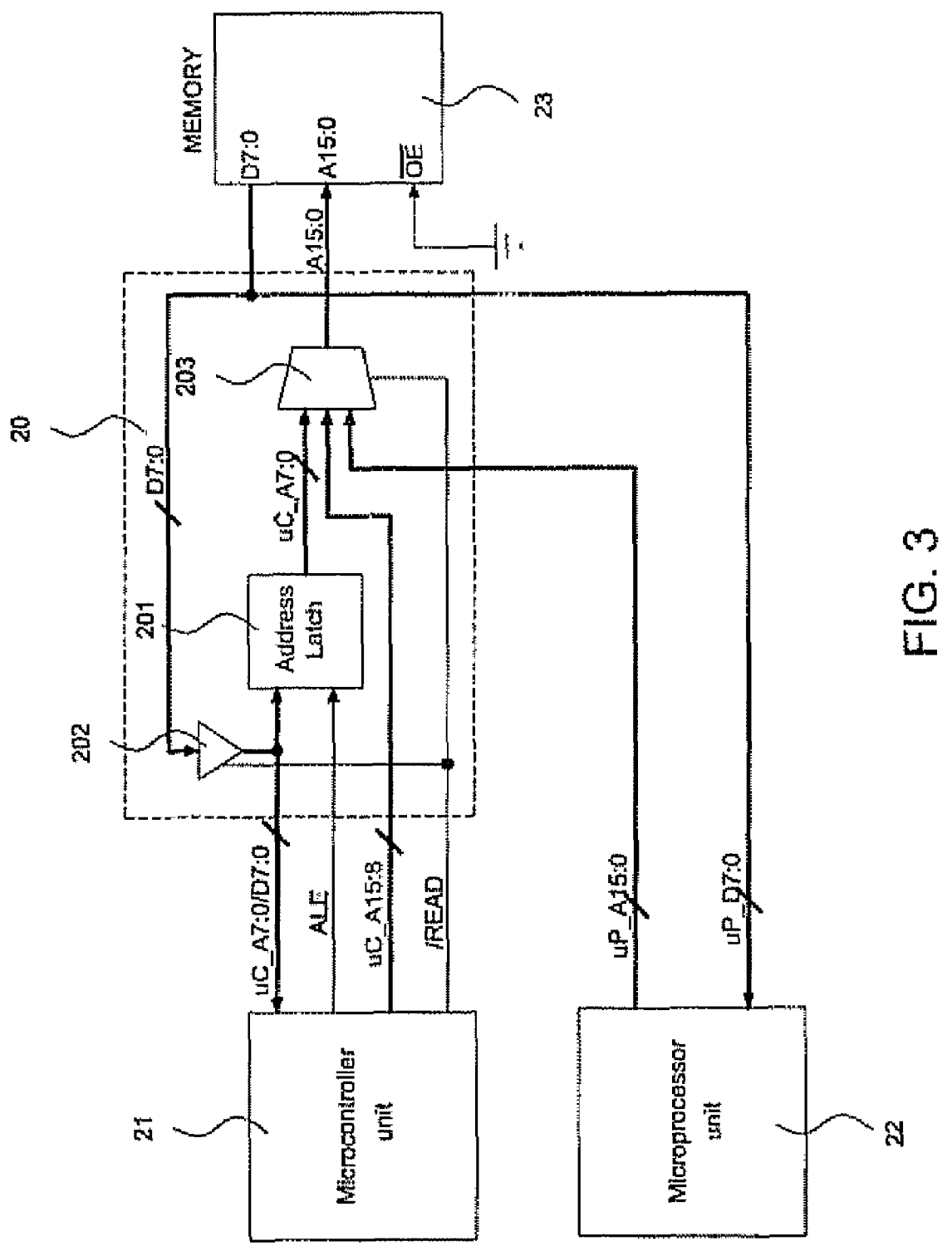
FIG. 3 shows a control system utilizing the memory access interface of the present invention.

FIG. 3 shows a control system using a memory access interface of the present invention. The control system includes a micro-controller unit 21, a microprocessor unit 22, a memory unit 23, and an access interface 20 The micro-controller unit 21 and the microprocessor unit 22 can access the data of the memory unit 23 through the access interface 20 during various stages, thereby achieving the object of sharing the memory unit 23.

The access interface 20 includes an address latch 201, a data buffer 202, and an address multiplexer 203. The access interface 20 receives the address/data multiplexing bus signal uC_A7:0/D7:0, the higher-bit address signal uC_A15:8, the address-latch-enable signal ALE and the reading signal/READ from the micro-controller unit 21. Also, the access interface 20 receives the address signal uP_A15:0 and data signal uP_D7:0 from the microprocessor unit 22.

The access interface 20 utilizes the address latch 201 to latch the lower-bit address signal uC_A7:0 of the address/data multiplexing bus signal uC_A7:0/D7:0 of the micro-controller unit 21 and to output a lower-bit address signal uC_A7:0 when the address-latch-enable signal ALE of the micro-controller unit 21 is enabled. The higher-bit address signal uC_A15:8 of the micro-controller unit 21 is merged with the lower-bit address signal uC_A7.0 outputted from the address latch 201 to generate an address signal uC_A15:0 of the micro-controller unit 21.

The address multiplexer 203 of the access interface 20 receives the address signal uC_A15:0 of the micro-controlled unit 21 and the address signal uP_A15:0 of the microprocessor unit 22, and selectively outputs either the address signal uC_A15:0 or the address signal uP_A15:0 according to the reading signal /READ of the micro-controller unit 21. That is, when the reading signal /READ is disabled, the address multiplexer 203 outputs the address signal UP_A15:0 of the microprocessor unit 22. On the other hand, when the reading signal /READ is enabled, the address multiplexer 203 outputs the address signal uC_A15:0 of the micro-controller unit 21.

The data buffer 202 receives the data D7:0 of the data bus from the memory unit 23 and outputs the data D7:0 to the address/data multiplexing bus A7:0/D7:0 of the micro-controller unit 21 when the reading signal/READ is enabled In addition, the data buffer 202 keeps the output at a high impedance state when the reading signal/READ is disabled It should be noted that, in addition to using the reading signal/READ to control the data buffer 202 and the address latch 201, the inverted address-latch-enable signal ALE may also be used as the control signal.

Figure 4:
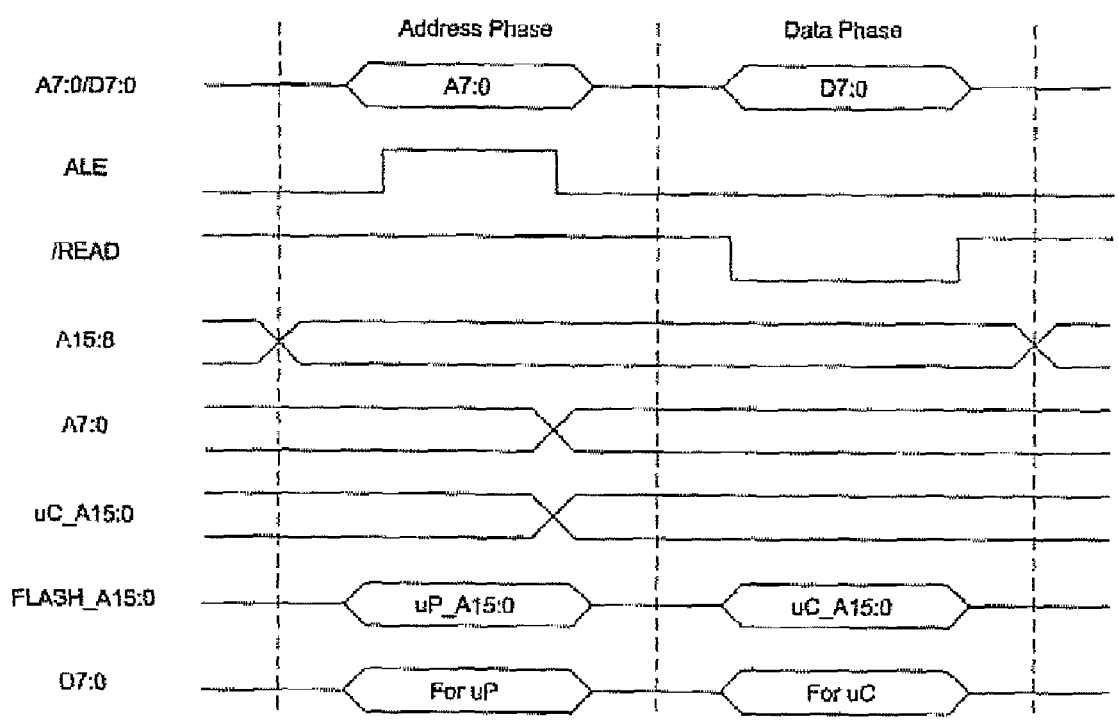
FIG. 4 shows a timing diagram during the accessing cycle of the control system of FIG. 3.

FIG. 4 shows a timing diagram in which the reading signal/READ serves as the control signal of the data buffer 202 and the address latch 201. As shown in the drawing, each accessing cycle is divided into an address phase and a data phase with respect to the micro-controller unit 21. At the address phase, the micro-controller unit 21 outputs the lower-bit address signal uC_A7:0 At this time, since the reading signal/READ is disabled, the address multiplexer 203 outputs the address signal uP_A15:0 of the microprocessor unit 22. Consequently, the microprocessor unit 22 may access the data of the memory unit 23 during the address phase. At the data phase, since the reading signal/READ is enabled, the data buffer 202 outputs the data D7:0 of the memory unit to the address/data multiplexing bus signal uC_A7:0/D7:0 of the micro-controller unit 21, and the address multiplexer 203 outputs the address signal uC_A15:0 of the micro-controller unit 21. Consequently, the micro-controller unit 21 may access the data of the memory unit 23 during the data phase.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For instance, the output enable pins of the memory unit are grounded in the embodiment, so the memory unit is always enabled. However, the memory unit does not need to be always enabled. It is only required that the memory unit is enabled when the memory unit is about to be accessed by the micro-controller unit or the microprocessor unit. So the output enable pins can also be controlled by the reading signal of the micro-controller unit, or by other control signals of the micro-controller unit, or by other control signals of the microprocessor unit.

What is claimed is:

1. A memory access interface for connecting a memory to a micro-controller and a first circuitry, the micro-controller being capable of transmitting a first group address signals and a second group address signals, the micro-controller being capable of transmitting the first group address signals or accessing data signals via an address/data bus, the memory access interface comprising:

an address holder for receiving the first group address signals on the address/data multiplexing bus and a first enable signal outputted from the micro-controller, and outputting the first group address signals when the first enable signal is enabled; and a multiplexer for receiving the first group address signals outputted from the address holder, the second group address signals outputted from the micro-controller, and third address signals outputted from the first circuitry, the multiplexer being controlled by a first control signal of the micro-controller for selectively outputting the first and second group address signals or outputting the third address signals to the memory;

wherein the micro-controller and the first circuitry can access the data of the memory according to the first enable signal.

2. The memory access interface according to claim 1, wherein the first control signal is the first enable signal.

3. The memory access interface according to claim 1, wherein the first control signal is a reading signal of the micro-controller.

4. The memory access interface according to claim 1, wherein the micro-controller accesses the data of the memory during a data cycle of the micro-controller and the first circuitry accesses the data of the memory during an address cycle of the micro-controller.

5. The memory access interface according to claim 1, wherein the first circuitry comprises a microprocessor.

6. The memory access interface according to claim 1, wherein the address holder is an address latch and the first control signal is an address-latch-enable signal.

7. The memory access interface according to claim 1, wherein the first group address signals are the lower-bit address signals of the micro-controller, and the second group address signals are the higher-bit address signals of the micro-controller.

8. The memory access interface according to claim 1, further comprising a data buffer for transmitting the data signals from the memory to the address/data bus of the micro-controller during the data cycle of the micro-controller, and for maintaining a high impedance state during the address cycle of the micro-controller, the data buffer being controlled by a second control signal of the micro-controller.

9. The memory access interface according to claim 8, wherein the second control signal is the first enable signal.

10. A memory access method for controlling the access among a memory, a micro-controller with an address/data multiplexing bus and a first device, the memory access method comprising the steps of:

the micro-controller outputting a first address signal during an address cycle of the micro-controller;

latching the first address signal as a latched address signal;

the first device outputting a second address signal to the memory and reading/writing data from/to the memory during the address cycle of the micro-controller; and outputting the latched address signal to the memory during a data cycle of the micro-controller; and the micro-controller reading/writing data from/to the memory during the data cycle of the micro-controller.

11. The memory access method according to claim 10, wherein the micro-controller further outputs a third address signal to the memory during the data cycle.

* * * * *